(12) United States Patent
Lu

(10) Patent No.: US 11,126,683 B2
(45) Date of Patent: Sep. 21, 2021

(54) BLOCKCHAIN-BASED CROSS-CHAIN DATA ACCESS METHOD AND APPARATUS

(71) Applicant: Advanced New Technologies Co., Ltd., Grand Cayman (KY)

(72) Inventor: Zhonghao Lu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/158,625

(22) Filed: Jan. 26, 2021

(65) Prior Publication Data

US 2021/0157875 A1 May 27, 2021

Related U.S. Application Data

(63) Continuation of application No. PCT/CN2019/101762, filed on Aug. 21, 2019.

(30) Foreign Application Priority Data

Oct. 26, 2018 (CN) .......................... 201811258153.0

(51) Int. Cl.
*G06F 16/955* (2019.01)
*H04L 9/06* (2006.01)
(Continued)

(52) U.S. Cl.
CPC ........ *G06F 16/9566* (2019.01); *G06F 16/958* (2019.01); *G06F 16/9577* (2019.01); *H04L 9/0643* (2013.01); *H04L 2209/38* (2013.01)

(58) Field of Classification Search
CPC ............... H04L 2209/38; H04L 9/0643; G06F 16/9566; G06F 16/958; G06F 16/9577
See application file for complete search history.

(56) References Cited

U.S. PATENT DOCUMENTS

| | | | |
|---|---|---|---|
| 10,530,776 B2* | 1/2020 | Grant | .................... H04L 63/102 |
| 2015/0244670 A1* | 8/2015 | Dong | .................. H04L 61/1511 |
| | | | 709/245 |

(Continued)

FOREIGN PATENT DOCUMENTS

| | | |
|---|---|---|
| CN | 103488765 | 1/2014 |
| CN | 106547766 | 3/2017 |

(Continued)

OTHER PUBLICATIONS

Ken Luo et al. "A Multiple Blockchains Architecture on Inter-Blockchain Communication," 2018, IEEE (Year: 2018).*

(Continued)

*Primary Examiner* — Arvin Eskandarnia
(74) *Attorney, Agent, or Firm* — Fish & Richardson P.C.

(57) ABSTRACT

One or more implementations of the present specification relate to blockchain-based cross-chain data access methods and apparatuses, and electronic devices. An access request that is specific to target data and that is sent by a node device is obtained. The target data is stored in a target blockchain of a multi-chain system that comprises a plurality of blockchains. The access request comprises an access path of the target data. The target blockchain that the target data is located in is determined based on the access path of the target data. A corresponding data access driver configured for the target blockchain is determined based on the access path of the target data. The data access driver is invoked to parse the access request and to access the target data.

16 Claims, 2 Drawing Sheets

(51) Int. Cl.
*G06F 16/957* (2019.01)
*G06F 16/958* (2019.01)

(56) References Cited

U.S. PATENT DOCUMENTS

| | | | |
|---|---|---|---|
| 2016/0253622 A1 | 9/2016 | Sriram et al. | |
| 2017/0345011 A1 | 11/2017 | Salami et al. | |
| 2018/0165476 A1* | 6/2018 | Carey | G06F 21/577 |
| 2018/0255130 A1 | 9/2018 | Kozloski et al. | |
| 2019/0188699 A1* | 6/2019 | Thibodeau | G06Q 20/3827 |
| 2019/0288832 A1* | 9/2019 | Dang | H04L 9/0637 |
| 2019/0334948 A1* | 10/2019 | Jiang | H04L 29/06 |
| 2020/0021446 A1* | 1/2020 | Roennow | H04L 63/0478 |
| 2020/0026658 A1* | 1/2020 | Han | G06F 16/322 |
| 2021/0067495 A1* | 3/2021 | Yuting | H04L 63/0464 |

FOREIGN PATENT DOCUMENTS

| | | |
|---|---|---|
| CN | 106992990 | 7/2017 |
| CN | 107231299 | 10/2017 |
| CN | 107292181 | 10/2017 |
| CN | 107679857 | 2/2018 |
| CN | 201823988 | 7/2018 |
| CN | 108446407 | 8/2018 |
| CN | 108540536 | 9/2018 |
| CN | 108616578 | 10/2018 |
| CN | 109582473 | 4/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Pallet.one [online], "PalletOne Protocol for Abstract-Level Ledger Ecosystem", Mar. 2018, retrieved on Feb. 4, 2021, retrieved from URL<https://pallet.one/doc/PalletOne_whitepaper_en.pdf>, 46 pages.
PCT International Search Report and Written Opinion in International Appln. No. PCT/CN2019/101762, dated Oct. 28, 2019, 9 pages (with partial English translation).
Extended European Search Report in European Application No. 19876773.3 dated Aug. 16, 2021, 9 pages.
Lemieux et al., "Preserving the Archival Bondin Distributed Ledgers: A Data Model and Syntax," Apr. 2017, World Wide Web Companion, pp. 1437-1443.
Third et al., "Linked Data Indexing of Distributed Ledgers," Apr. 2017, World Wide Web Companion, pp. 1431-1436.

* cited by examiner

BLOCKCHAIN-BASED CROSS-CHAIN DATA ACCESS METHOD AND APPARATUS

CROSS-REFERENCE TO RELATED APPLICATIONS

This application is a continuation of PCT Application No. PCT/CN2019/101762, filed on Aug. 21, 2019, which claims priority to Chinese Patent Application No. 201811258153.0, filed on Oct. 26, 2018, and each application is hereby incorporated by reference in its entirety.

TECHNICAL FIELD

The present specification relates to the field of network communications technologies, and in particular, to blockchain-based cross-chain data access methods and apparatuses.

BACKGROUND

As blockchain technologies develop, more chains including public chains, consortium chains, and private chains emerge. Therefore, interconnection operations between chains and cross-chain data interaction are increasingly emphasized and needed. However, there is no cross-chain data operation method in a standard format currently.

SUMMARY

To alleviate the previously described problem, the present specification provides a blockchain-based cross-chain data access method. The method is applied to a multi-chain system including a plurality of blockchains, and includes the following: obtaining an access request that is specific to target data and that is sent by any node device, where the access request includes an access path of the target data; determining, based on the access path of the target data, a target blockchain that the target data is located in, where a corresponding data access driver is configured for the target blockchain; and invoking the data access driver to parse the access request, to access the target data.

In some embodiments, the access request includes a uniform resource locator (URL), and the URL includes the access path of the target data.

In some embodiments, the URL includes a domain field, and the domain field is used to record information about the target blockchain that the target data is located in; and the determining, based on the access path of the target data, a target blockchain that the target data is located in includes the following: determining, based on the domain field of the URL, the target blockchain that the target data is located in.

In some embodiments, the URL further includes a feature value field of the target data, used to record a feature value of the target data; and the invoking the data access driver to parse the access request, to access the target data includes the following: invoking the data access driver to parse the URL, and obtaining the target data based on the feature value field of the URL; and returning the target data to the node device.

In some embodiments, the URL further includes a retrieval space field, used to record identification information of data retrieval space used when the feature value of the target data is used as a query index to query the target data on the target blockchain; and the obtaining the target data based on the feature value field of the URL includes the following: obtaining, based on the domain field and the retrieval space field, data retrieval space of the target blockchain that the target data is located in; and performing retrieval in the data retrieval space based on the feature value of the target data, to obtain the target data.

In some embodiments, the URL further includes a code identification field, used to record an output coding scheme of the target data; and the returning the target data to the node device includes the following: parsing the code identification field to obtain the output coding scheme of the target data; coding the obtained target data based on the output coding scheme; and returning the coded target data to the node device.

In some embodiments, the output coding scheme includes a JavaScript Object Notation (JSON) scheme or an Extensible Markup Language (XML) scheme.

In some embodiments, the feature value field of the URL is used to record a digital digest of the target data; and the invoking the data access driver to parse the access request, to access the target data further includes the following: checking whether a digital digest of the obtained target data is the same as the digital digest of the target data recorded in the feature value field of the URL; and if yes, returning the target data to the node device.

In some embodiments, the domain field further includes the following fields: a protocol field, used to record a protocol name of a blockchain protocol supported by the target blockchain; and an instance field, used to record an instance name of an instance of the target blockchain when the target blockchain serves as a blockchain supporting the blockchain protocol.

In some embodiments, the multi-chain system includes a blockchain system that includes a main chain and a plurality of subchains corresponding to the main chain.

The present specification further provides a blockchain-based cross-chain data access apparatus. The apparatus is applied to a multi-chain system including a plurality of blockchains, and includes the following: an obtaining unit, configured to obtain an access request that is specific to target data and that is sent by any node device, where the access request includes an access path of the target data; a determining unit, configured to determine, based on the access path of the target data, a target blockchain that the target data is located in, where a corresponding data access driver is configured for the target blockchain; and a data access driver invoking unit, configured to invoke the data access driver to parse the access request, to access the target data.

In some embodiments, the access request includes a URL, and the URL includes the access path of the target data.

In some embodiments, the URL includes a domain field, and the domain field is used to record information about the target blockchain that the target data is located in; and the determining unit is configured to determine, based on the domain field of the URL, the target blockchain that the target data is located in.

In some embodiments, the URL further includes a feature value field of the target data, used to record a feature value of the target data; and the data access driver invoking unit is configured to invoke the data access driver to parse the URL, and obtain the target data based on the feature value field of the URL; and return the target data to the node device.

In some embodiments, the URL further includes a retrieval space field, used to record identification information of data retrieval space used when the feature value of the target data is used as a query index to query the target data on the target blockchain; and the data access driver invoking unit is configured to obtain, based on the domain field and the retrieval space field, data retrieval space of the target blockchain that the target data is located in; and perform retrieval in the data retrieval space based on the feature value of the target data, to obtain the target data.

In some embodiments, the URL further includes a code identification field, used to record an output coding scheme of the target data; and the data access driver invoking unit is configured to parse the code identification field to obtain the output coding scheme of the target data; code the obtained target data based on the output coding scheme; and return the coded target data to the node device.

In some embodiments, the output coding scheme includes a JSON scheme or an XML scheme.

In some embodiments, the feature value field of the URL is used to record a digital digest of the target data; and the data access driver invoking unit is configured to check whether a digital digest of the obtained target data is the same as the digital digest recorded in the feature value field of the URL; and if yes, return the target data to the node device.

In some embodiments, the domain field further includes the following fields: a protocol field, used to record a protocol name of a blockchain protocol supported by the target blockchain; and an instance field, used to record an instance name of an instance of the target blockchain when the target blockchain serves as a blockchain supporting the blockchain protocol.

In some embodiments, the multi-chain system includes a blockchain system that includes a main chain and a plurality of subchains corresponding to the main chain.

Correspondingly, the present specification further provides a computer readable storage medium, storing a computer program. When the computer program is executed by a processor, the blockchain-based cross-chain data access method is performed.

According to the blockchain-based cross-chain data access methods and apparatuses provided in the present specification, a specific path for accessing the target data in the target blockchain is indicated by using access path information, and the data access driver corresponding to the target blockchain is determined based on the access path information. In the technical solution of customizing the data access driver of the blockchain provided in the present specification, the data access driver can be extended more easily, and the data access driver is customizable and pluggable. In addition, when a data access operation is performed, only a data access driver that needs to be used and a chain protocol of the target blockchain needs to be loaded, saving resources of the multi-chain system. When developing a cross-chain data access protocol, a data system developer only needs to develop a corresponding data access driver for each blockchain, without changing other parts of a protocol family of a data access request, thereby reducing development costs. In addition, based on the configuration of the data access driver for the blockchain, modifications of basic chain protocols of different blockchains do not affect data access operations of other chains. Therefore, after the data access driver corresponding to the blockchain is decoupled, upgrade and maintenance of the corresponding blockchain become easier.

DESCRIPTION OF EMBODIMENTS

Figure 1:
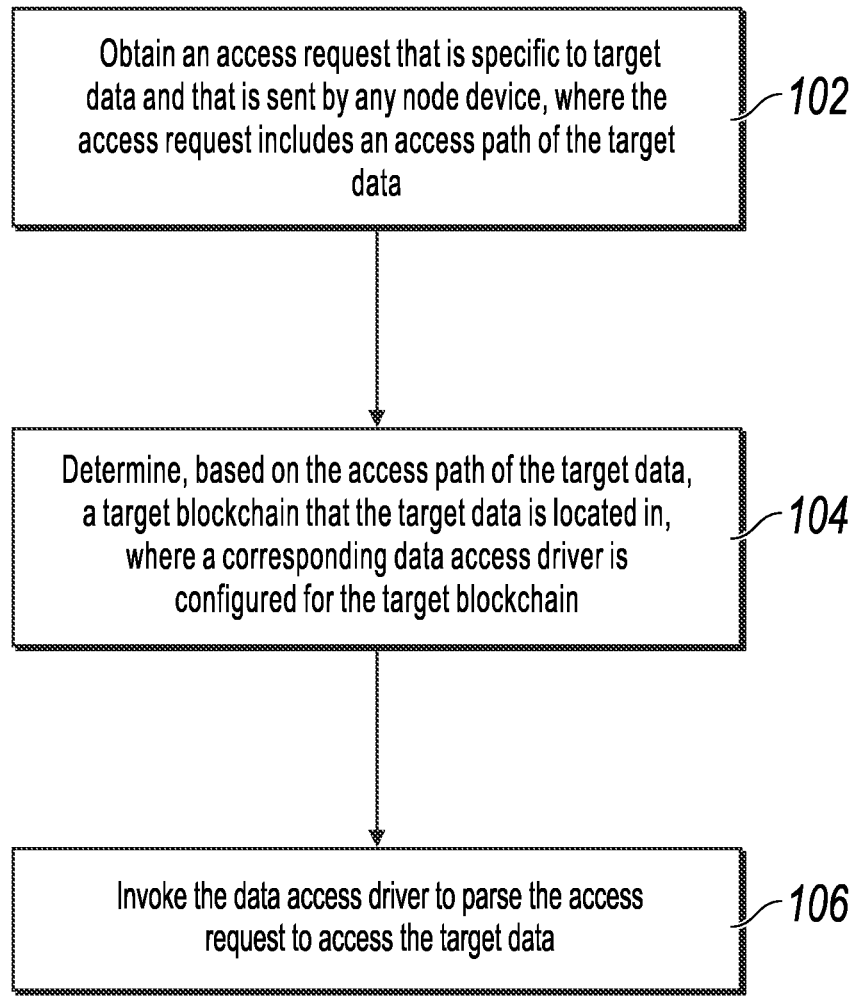
FIG. 1 is a flowchart illustrating a blockchain-based cross-chain data access method, according to an example embodiment of the present specification.

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with the present specification. On the contrary, the implementations are only examples of apparatuses and methods that are described in the appended claims in detail and consistent with some aspects of the present specification.

It is worthwhile to note that, steps of corresponding methods in other embodiments are not necessarily performed in the order shown and described in the present specification. Methods in some other embodiments can include more or less steps than those described in the present specification. In addition, a single step described in the present specification may be divided into a plurality of steps for description in other embodiments, and a plurality of steps described in the present specification may also be combined into a single step for description in other embodiments.

Specifically, a "blockchain" can be a peer to peer (P2P) network system that is formed by nodes by using a consensus mechanism and that has a distributed data storage structure. Data in the blockchain is distributed on "blocks (block)" that are connected to each other in terms of time. A latter block includes a data digest of a previous block. In addition, full data backup of all or some of the nodes is achieved based on different consensus mechanisms (for example, Proof of Work (PoW), Proof of Stake (PoS), Delegated Proof of Stake (DPoS), and Practical Byzantine Fault Tolerance (PBFT)). The blockchain can include a public blockchain, a consortium blockchain, a private blockchain, etc. based on a distribution form of the network nodes of the blockchain. In actual applications, especially in actual applications of the consortium blockchain, a separate blockchain is usually configured for different scenarios, for example, a blockchain used to process a house rental service or a blockchain used to process a music work copyright service. In addition, a related service subchain is further developed for a blockchain configured in a relatively large application scenario. For example, a plurality of subchains of a plurality of house rental subservices can be attached to a main chain of the blockchain used to process a house rental service, including a subchain specially used to collect a house rental order and a subchain specially used to collect details of houses that can be rented. The subchains are a plurality of instances that comply with a main chain protocol of the blockchain. To implement a multi-blockchain network ecosystem with value interconnection and information interconnection, cross-blockchain data access or operations become a key to alleviate the problem.

To alleviate the previously described problem, FIG. 1 is a flowchart illustrating a blockchain-based cross-chain data access method, according to an example embodiment of the present specification. The blockchain-based cross-chain data access method is applied to a multi-chain system including a plurality of blockchains. The multi-chain system described in the embodiments of the present specification can include a plurality of homogeneous blockchains that follow the same basic blockchain protocol, and can also include heterogeneous blockchains that follow different basic blockchain protocols. Architectures of the plurality of blockchains are not limited to a main chain—side chain architecture, a main chain—multi-subchain architecture, and a parallel multi-chain architecture. Target data between chains can be accessed by using a cross-chain data interaction interface or a multi-chain operating system.

The method includes the following steps.

Step 102: Obtain an access request that is specific to target data and that is sent by any node device, where the access request includes an access path of the target data.

According to the blockchain-based cross-chain data access method provided in the previously described embodiment, a node device on any blockchain in a multi-blockchain system ("multi-chain system" for short) can access target data in a distributed database of any blockchain in the multi-chain system, and any external node device not in the multi-chain system can also access target data in a distributed database of any blockchain in the multi-chain system. The multi-chain system obtains an access request that is specific to target data and that is sent by any node device, where the access request includes an access path of the target data.

The access path of the target data can be included in the access request in a plurality of forms. In some embodiments, the access request includes a uniform resource locator (URL), and the URL includes the access path of the target data.

Step 104: Determine, based on the access path of the target data, a target blockchain that the target data is located in, where a corresponding data access driver is configured for the target blockchain.

In this embodiment, the corresponding data access driver is configured for the target blockchain in the multi-chain system, and the data access driver is generated based on an underlying protocol of the target blockchain. By parsing the access request specific to the target data, the target blockchain that the target data is located in is determined based on the access path of the target data. A plurality of blockchains in the multi-chain system are usually heterogeneous blockchains generated based on different blockchain protocols. Therefore, in the embodiments provided in the present specification, corresponding data access drivers can be respectively configured for a plurality of blockchains in the multi-chain system so that the target data can be accessed on a corresponding blockchain by invoking a data access driver corresponding to the corresponding blockchain.

In some embodiments, the URL included in the access request includes a domain field, and the domain field is used to record information about the target blockchain that the target data is located in. The information about the target blockchain that the target data is located in can be obtained by parsing the domain field included in the URL of the access request so that the corresponding data access driver can be configured for the access request.

The domain field in the URL in this embodiment is used to record the information about the target blockchain that the target data is located in. The information about the target blockchain can be specifically represented in a plurality of forms. For example, in a multi-chain system including a plurality of parallel blockchains, a unique identifier (ID) is configured for each blockchain, and the domain field can include a unique ID of the target blockchain. For another example, in a multi-chain system of a main chain—subchain architecture, a main chain of a blockchain has a unique ID, and each subchain has an identification ID in a main chain directory, so that the domain field can include the unique ID of the main chain and the identification ID of the subchain in the main chain directory, so as to indicate the target blockchain that stores the target data in the plurality of blockchains. A person skilled in the art can further derive more representation methods of the domain field that can be used to indicate the target blockchain in a specific application scenario, which shall fall within the protection scope of the present specification.

In some embodiments, the domain field in the URL in the previously described embodiment further includes the following fields: a protocol field, used to record a protocol name of a blockchain protocol supported by the target blockchain; and an instance field, used to record an instance name of an instance of the target blockchain when the target blockchain serves as a blockchain supporting the blockchain protocol. The target blockchain can be uniquely determined by using the blockchain protocol supported by the target blockchain and the instance name of the target blockchain.

Step 106: Invoke the data access driver to parse the access request, to access the target data.

The data access driver parses the access request and obtains the target data based on the access path of the target data included in the access request.

In some embodiments, the URL in the access request further includes a feature value field of the target data, and the invoking the data access driver to parse the access request, to access the target data in the previously described embodiment includes the following: invoking the data access driver to parse the URL, and obtaining the target data based on the feature value field of the URL; and returning the target data to the node device.

The data access driver corresponding to the target blockchain is invoked to parse the URL included in the access request, to obtain the feature value field of the URL. For the obtaining the target data based on the feature value field of the URL, the feature value of the target data can be used as a retrieval object in a database of the target blockchain to obtain the target data. Further, the data access driver can return the obtained target data to the node device that sends the access request specific to the target data.

The feature value of the target data in the previously described embodiment can be any type of feature value of the target data. The feature value of the target data can be a unique feature value of the target data, for example, a sequence number or a data digest of the target data. The feature value of the target data can alternatively be a non-unique feature value of the target data, that is, a feature value the same as a feature value of other data in the database of the blockchain, for example, an attribute of a data content object included in the target data. For example, the target data is a transfer transaction with the amount of B initiated by user A, and the non-unique feature value can be an account address of user A or a transfer value of amount B. When the feature value is the unique feature value of the target data, the data access driver can uniquely obtain the target data. When the feature value is the non-unique feature value of the target data, the data access driver can obtain a plurality of pieces of data in the database of the target blockchain, including the target data.

In some embodiments, the URL further includes a retrieval space field, used to record identification information of data retrieval space used when the feature value of the target data is used as a query index to query the target data on the target blockchain. Correspondingly, the obtaining the target data based on the feature value field of the URL in the previously described embodiment includes the following: parsing the domain field and the retrieval space field to obtain data retrieval space of the target blockchain that the target data is located in; and performing retrieval in the data retrieval space based on the feature value of the target data, to obtain the target data.

The data retrieval space is database space used when the feature value of the target data is used as the query index. For example, the data retrieval space on the blockchain can be database space that is used for data retrieval and that is maintained by the node device of the blockchain, for example, block database space, block header database space, transaction database space, transaction Merkel tree database space, or state Merkel tree database space. The target data corresponding to the feature value of the target data can be efficiently retrieved from the corresponding data retrieval space by using the feature value of the target data as the query index.

For example, when the feature value of the target data is a transaction hash digest value (TxID) in a certain block on the target blockchain, the retrieval space field in the URL included in the access request can be correspondingly represented as "txs" so that the data access driver corresponding to the target blockchain performs retrieval based on the TxID value in transaction data retrieval space of the target blockchain. When the feature value of the target data is a hash digest value (Block Hash) in a certain block on the target blockchain, the retrieval space fields in the URL included in the access request can be correspondingly represented as "blocks" so that the data access driver corresponding to the target blockchain performs retrieval based on the Block Hash value in block data retrieval space of the target blockchain. In different data retrieval spaces of the blockchain, retrieval is directly performed based on the feature value of the target data, so as to prevent searching for the target data by successively traversing all data on the target blockchain, thereby accurately and efficiently accessing the target data.

Further, to ensure that the target data obtained by the data access driver is the same as the target data that the node device sending the access request wants to access, when the feature value of the target data is a digital digest value of the target data, the invoking the data access driver to parse the access request, to access the target data in the previously described embodiment further includes the following: checking whether a digital digest of the obtained target data is the same as the digital digest of the target data recorded in the feature value field of the URL; and if yes, which indicates that the data obtained by the data access driver is the target data that the node device requires to access, returning the target data to the node device.

The node device that sends the access request specific to the target data usually has certain format or coding requirements for the target data returned by the data access driver of the target blockchain. Therefore, in some embodiments, the URL further includes a code identification field, used to record an output coding scheme of the target data. The returning the target data to the node device in the previously described embodiment includes the following: parsing the code identification field to obtain the output coding scheme of the target data; coding the obtained target data based on the output coding scheme; and returning the coded target data to the node device. The output coding scheme can include a JavaScript Object Notation (JSON) scheme, an Extensible Markup Language (XML) scheme, etc.

In the technical solution of customizing the data access driver of the blockchain provided in this embodiment, the data access driver can be extended more easily, and the data access driver is customizable and pluggable. In addition, when a data access operation is performed, only a data access driver that needs to be used and a chain protocol of the target blockchain needs to be loaded, saving resources of the multi-chain system. When developing a cross-chain data access protocol, a data system developer only needs to develop a corresponding data access driver for each blockchain, without changing other parts of a protocol family of a data access request, thereby reducing development costs. In addition, based on the configuration of the data access driver for the blockchain, modifications of basic chain protocols of different blockchains do not affect data access operations of other chains. Therefore, after the data access driver corresponding to the blockchain is decoupled, upgrade and maintenance of the corresponding blockchain become easier.

Accessing cross-chain block data in a multi-chain system is used as an application instance of the method below. For example, a certain blockchain system includes a plurality of main chains of a blockchain used for urban government management. A plurality of credit institutions such as a large-scale house rental intermediary institution, a financial institution, a house rental market management institution, and a residence permit registration management institution constitute a main chain of a consortium blockchain based on house rental market transaction and management needs. A name of a blockchain protocol followed by the main chain of the consortium blockchain is my chain, and the previously described credit institutions participate in consensus, accounting, etc. of the consortium blockchain as members of the consortium blockchain. To subdivide specific services involved in a house rental market transaction and management process, the consortium blockchain serves as a main chain. Subchains such as a subchain of a blockchain (instance name is rent) specially used to collect a house rental order and a subchain of a blockchain (instance name is house) specially used to collect details of houses that can be rented can be developed based on the main chain.

In some embodiments, any node device on the subchain house sends an access request specific to target data to the subchain rent, and the data access request includes a URL "udag://mychain.rent.txs/F01a10123456789" used to indicate an access path of the target data.

udag is a name of a protocol followed by the URL. A person skilled in the art should know that a plurality of URL protocol formats can be designed based on the URL field definition method provided in the present specification. mychain.rent is a domain field in the URL, used to record information about the target blockchain that the target data is located in. In this embodiment, mychain is a protocol name of a blockchain protocol supported by the target blockchain, and rent is an instance name of an instance of the target blockchain when the target blockchain serves as a blockchain supporting the blockchain protocol mychain.

In the multi-chain system, corresponding data access drivers are designed for blockchains following different protocols or instances. In this embodiment, by parsing the access path information included in the access request, that is, the domain field mychain.rent in the URL, a blockchain that supports the mychain protocol and whose instance name is rent is determined as the target blockchain that the target data is located in, so that a data access driver corresponding to the target blockchain is invoked.

When loading the data access driver, the system accesses a node device on the corresponding target blockchain based on a registered routing table, to obtain the corresponding target data from a database of the target blockchain backed up by the node device.

The data access driver of the target blockchain is run to further parse the URL. In this embodiment, the URL further includes a retrieval space field "txs", indicating that the target data corresponding to the access request should be obtained by performing retrieval in blockchain transaction (transaction) retrieval space. The transaction (transaction) in the present specification refers to data that is created by a user by using a client device of the blockchain and that needs to be finally deployed in the distributed blockchain database. There are a transaction in a narrow sense and a transaction in a broad sense in the blockchain. The transaction in a narrow sense refers to value transfer deployed by the user to the blockchain. For example, in a conventional bitcoin blockchain network, the transaction can be transfer initiated by the user in the blockchain. However, the transaction in a broad sense refers to service data that is deployed by the user to the blockchain and that has a service intention. For example, an operator can establish a consortium blockchain based on actual service needs, and deploy some other types of online services (such as a house rental service, a vehicle scheduling service, an insurance claim service, a credit service, and a medical service) unrelated to value transfer depending on the consortium blockchain. In such a consortium blockchain, the transaction can be a service message or a service request that is deployed by the user to the consortium blockchain and that has a service intention. The transaction in the present specification can be the transaction in a narrow sense or the transaction in a broad sense.

The data access driver further parses the URL. In the field "F01a10123456789", F01 is used to represent some self-description information of the URL, such as a version number or coding format information of a digital digest. The field can be further extended as needed. "a1" is an output code identification field of the target data, used to record an output coding scheme of the target data. The digital digest value "0123456789" is feature value information of the target data. That is, in the transaction retrieval space of the target blockchain indicated by txs, retrieval is performed by using the digital digest value 0123456789 as a query index, to obtain the corresponding target data. After obtaining the corresponding target data—target transaction with the digital digest value "0123456789", the data access driver queries a data output coding format corresponding to the output coding scheme "a1", and codes and outputs the target transaction based on the corresponding output coding format. For example, output content of the target transaction is the following:

```
{
    time stamp:100,
    type: 123,
    content: {
    "address":"No. 292 Renmin Road"
    ...
    }
    refs:[ udag://mychain.rent.txs/F01a10123456789]
}
```

Different data output coding formats can be registered on the data access driver. Before outputting the obtained target data, the data access driver directly uses the corresponding data output coding format in the registry to code the target data, to complete output of the target data.

Further, the data access driver can check whether the digital digest value of the obtained target data is the same as the digital digest value "0123456789", to prevent possible tampering of the target data by the node device on the target blockchain accessed based on the registered routing table. The previously described implementation in which the digital digest is used as a retrieval object to retrieve the target data and whether the digital digest of the obtained target data is the same as the retrieval object is checked can be called a "content-addressable" method. Because the digital digest of the target data is uniquely corresponding to the target data, the content-addressable method can ensure that the obtained target data is the expected data to be accessed and has not been tampered with in the storage database.

A person skilled in the art should know that some fields included in the data format of a multi-layer structure described in the previously described embodiment of the present specification can be empty in actual use, but this does not affect the protection scope of the present specification.

Figure 3:
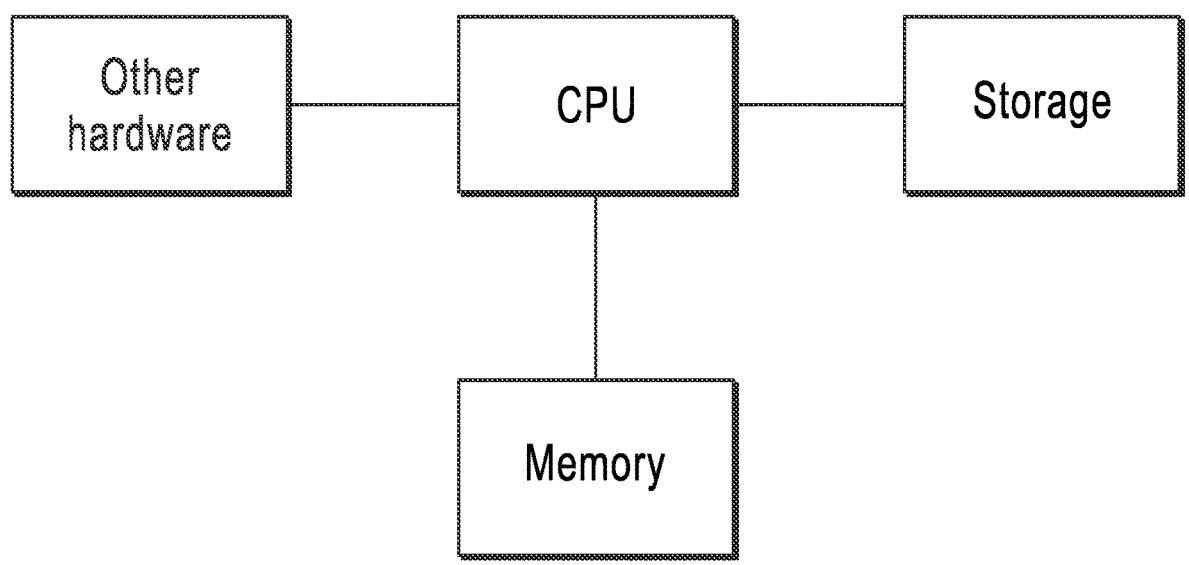
FIG. 3 is a diagram illustrating a hardware structure used to perform a method or apparatus embodiment for accessing data between a plurality of blockchains provided in the present specification.

Corresponding to the previous procedure implementation, embodiments of the present specification further provide a blockchain-based data processing apparatus 20. The apparatus 20 can be implemented by using software, or can be implemented by using hardware, or can be implemented by using a combination of hardware and software. Software implementation is used as an example. As a logic apparatus, the software is formed by reading a corresponding computer program instruction into a memory using a central processing unit (CPU) in a device that the software is located on. In terms of hardware, in addition to a CPU, a memory, and a storage device shown in FIG. 3, the device that the data processing apparatus is located on usually further includes other hardware such as a chip for sending and receiving radio signals, and/or other hardware such as a card for implementing a network communication function.

Figure 2:
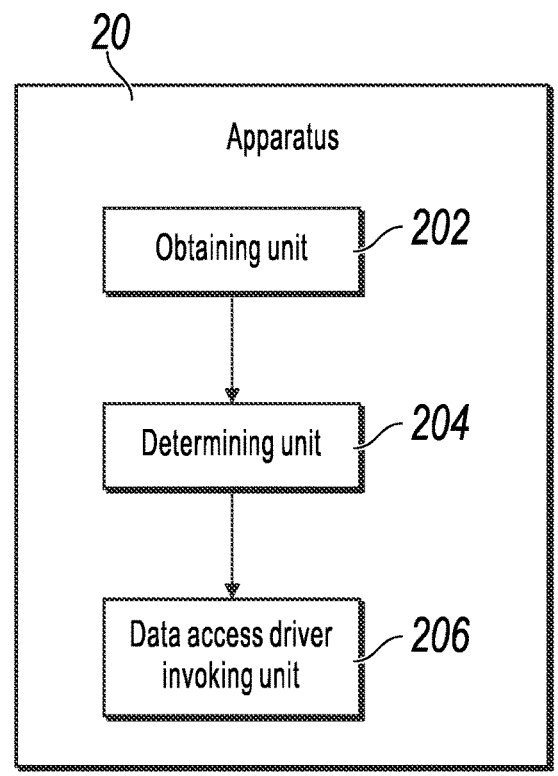
FIG. 2 is a schematic diagram illustrating a blockchain-based cross-chain data access apparatus, according to an example embodiment of the present specification.

FIG. 2 illustrates a blockchain-based cross-chain data access apparatus 20 provided in the present specification. The apparatus 20 is applied to a multi-chain system including a plurality of blockchains, and includes the following: an obtaining unit 202, configured to obtain an access request that is specific to target data and that is sent by any node device, where the access request includes an access path of the target data; a determining unit 204, configured to determine, based on the access path of the target data, a target blockchain that the target data is located in, where a corresponding data access driver is configured for the target blockchain; and a data access driver invoking unit 206, configured to invoke the data access driver to parse the access request, to access the target data.

In some embodiments, the access request includes a URL, and the URL includes the access path of the target data.

In some embodiments, the URL includes a domain field, and the domain field is used to record information about the target blockchain that the target data is located in; and the determining unit 204 is configured to determine, based on the domain field of the URL, the target blockchain that the target data is located in.

In some embodiments, the URL further includes a feature value field of the target data, used to record a feature value of the target data; and the data access driver invoking unit 206 is configured to invoke the data access driver to parse the URL, and obtain the target data based on the feature value field of the URL; and return the target data to the node device.

In some embodiments, the URL further includes a retrieval space field, used to record identification information of data retrieval space used when the feature value of the target data is used as a query index to query the target data on the target blockchain; and the data access driver invoking unit 206 is configured to obtain, based on the domain field and the retrieval space field, data retrieval space of the target blockchain that the target data is located in; and perform retrieval in the data retrieval space based on the feature value of the target data, to obtain the target data.

In some embodiments, the URL further includes a code identification field, used to record an output coding scheme of the target data; and the data access driver invoking unit 206 is configured to parse the code identification field to obtain the output coding scheme of the target data; code the obtained target data based on the output coding scheme; and return the coded target data to the node device.

In some embodiments, the output coding scheme includes a JSON scheme or an XML scheme.

In some embodiments, the feature value field of the URL is used to record a digital digest of the target data; and the data access driver invoking unit 206 is configured to check whether a digital digest of the obtained target data is the same as the digital digest of the target data recorded in the feature value field of the URL; and if yes, return the target data to the node device.

In some embodiments, the domain field further includes the following fields: a protocol field, used to record a protocol name of a blockchain protocol supported by the target blockchain; and an instance field, used to record an instance name of an instance of the target blockchain when the target blockchain serves as a blockchain supporting the blockchain protocol.

In some embodiments, the multi-chain system includes a blockchain system that includes a main chain and a plurality of subchains corresponding to the main chain.

For detailed implementation processes of functions and roles of the units in the previously described apparatus, references can be made to the implementation processes of corresponding steps in the previously described method. For related parts, references can be made to descriptions in the method embodiment. Details are omitted here for simplicity.

The described apparatus embodiment is merely an example. The units described as separate parts can or do not have to be physically separate, and parts displayed as units can or do not have to be physical modules, can be located in one position, or can be distributed on a plurality of network modules. Some or all of the units or modules can be selected based on actual needs to achieve the objectives of the solutions in the present specification. A person of ordinary skill in the art can understand and implement the embodiments of the present specification without creative efforts.

The apparatus, unit, or module described in the previously described embodiments can be implemented by a computer chip or an entity, or implemented by a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previously described method embodiment, embodiments of the present specification further provide a computer device, and the computer device includes a memory and a processor. The memory stores a computer program that can be executed by the processor. When running the stored computer program, the processor performs steps of the blockchain-based cross-chain data access method in the embodiments of the present specification. For detailed descriptions of the steps of the blockchain-based cross-chain data access method, references can be made to the previous content, and no repetition is needed.

Corresponding to the previously described method embodiment, embodiments of the present specification further provide a computer readable storage medium, and the storage medium stores a computer program. When the computer program is executed by a processor, steps of the blockchain-based cross-chain data access method in the embodiments of the present specification are performed. For detailed descriptions of the steps of the blockchain-based cross-chain data access method, references can be made to the previous content, and no repetition is needed.

The previous descriptions are merely example embodiments of the present specification, but are not intended to limit the present specification. Any modification, equivalent replacement, or improvement made without departing from the spirit and principle of the present specification shall fall within the protection scope of the present specification.

In typical configuration, the computing device includes one or more processors (CPU), an input/output interface, a network interface, and a memory.

The memory can include a form of a volatile memory, a random access memory (RAM) and/or a nonvolatile memory, etc. in a computer readable medium, such as a read-only memory (ROM) or a flash memory (flash RAM). The memory is an example of the computer readable medium.

The computer readable medium includes volatile and nonvolatile, removable and non-removable media, and can store information by using any method or technology. The information can be a computer readable instruction, a data structure, a program module, or other data.

Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by the computing device. Based on the definition in the present specification, the computer readable medium does not include a transitory computer readable medium (transitory media), for example, a modulated data signal and carrier.

It is worthwhile to further note that, the terms "include", "contain", or their any other variants are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the embodiments of the present specification can be provided as a method, a system, or a computer program product. Therefore, the embodiments of the present specification can use a form of hardware only embodiments, software only embodiments, or embodiments with a combination of software and hardware. In addition, the embodiments of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented method, comprising:
obtaining an access request that is specific to target data and that is sent by a node device, wherein the target data is stored in a target blockchain of a multi-chain system that comprises a plurality of blockchains, wherein the access request comprises an access path of the target data;
determining, based on the access path of the target data, the target blockchain that the target data is located in;
determining, based on the access path of the target data, a corresponding data access driver configured for the target blockchain; and
invoking the corresponding data access driver to parse the access request to access the target data, wherein the access request comprises a uniform resource locator (URL), and the URL comprises the access path of the target data, and wherein the URL comprises a domain field recording information about the target blockchain that the target data is located in; and the determining, based on the access path of the target data, the target blockchain that the target data is located in comprises:
determining, based on the domain field of the URL, the target blockchain that the target data is located in.

2. The computer-implemented method of claim 1, wherein the URL further comprises a feature value field of the target data recording a feature value of the target data; and the invoking the corresponding data access driver to parse the access request to access the target data comprises:
invoking the corresponding data access driver to parse the URL, and accessing the target data based on the feature value field of the URL; and
returning the target data to the node device.

3. The computer-implemented method of claim 2, wherein the URL further comprises a retrieval space field recording identification information of data retrieval space used when the feature value of the target data is used as a query index to query the target data on the target blockchain; and the accessing the target data based on the feature value field of the URL comprises:
obtaining, based on the domain field and the retrieval space field, data retrieval space of the target blockchain that the target data is located in; and
performing retrieval in the data retrieval space based on the feature value of the target data, to access the target data.

4. The computer-implemented method of claim 2, wherein the URL further comprises a code identification field recording an output coding scheme of the target data; and
the returning the target data to the node device comprises:
parsing the code identification field to obtain the output coding scheme of the target data;
coding the target data based on the output coding scheme; and
returning the coded target data to the node device.

5. The computer-implemented method of claim 4, wherein the output coding scheme comprises a JavaScript Object Notation (JSON) scheme or an Extensible Markup Language (XML) scheme.

6. The computer-implemented method of claim 2, wherein the feature value field of the URL records a digital digest of the target data; and the invoking the data access driver to parse the access request to access the target data further comprises:
determining that a digital digest of the target data is the same as the digital digest of the target data recorded in the feature value field of the URL; and
in response, returning the target data to the node device.

7. The computer-implemented method of claim 1, wherein the domain field further comprises the following fields:
a protocol field recording a protocol name of a blockchain protocol supported by the target blockchain; and
an instance field recording an instance name of an instance of the target blockchain, wherein the target blockchain serves as a blockchain supporting the blockchain protocol.

8. The computer-implemented method of claim 1, wherein the multi-chain system comprises a blockchain system that comprises a main chain and a plurality of subchains corresponding to the main chain.

9. A non-transitory, computer-readable medium storing one or more instructions executable by a computer system to perform operations comprising:
obtaining an access request that is specific to target data and that is sent by a node device, wherein the target data is stored in a target blockchain of a multi-chain system that comprises a plurality of blockchains, wherein the access request comprises an access path of the target data;
determining, based on the access path of the target data, the target blockchain that the target data is located in;
determining, based on the access path of the target data, a corresponding data access driver configured for the target blockchain; and
invoking the corresponding data access driver to parse the access request to access the target data, wherein the access request comprises a uniform resource locator (URL), and the URL comprises the access path of the target data, and wherein the URL comprises a domain field recording information about the target blockchain that the target data is located in; and the determining, based on the access path of the target data, the target blockchain that the target data is located in comprises:
determining, based on the domain field of the URL, the target blockchain that the target data is located in.

10. The non-transitory, computer-readable medium of claim 9, wherein the URL further comprises a feature value field of the target data recording a feature value of the target data; and the invoking the corresponding data access driver to parse the access request to access the target data comprises:
invoking the corresponding data access driver to parse the URL, and accessing the target data based on the feature value field of the URL; and
returning the target data to the node device.

11. The non-transitory, computer-readable medium of claim 10, wherein the URL further comprises a retrieval space field recording identification information of data retrieval space used when the feature value of the target data is used as a query index to query the target data on the target blockchain; and the accessing the target data based on the feature value field of the URL comprises:
  obtaining, based on the domain field and the retrieval space field, data retrieval space of the target blockchain that the target data is located in; and
  performing retrieval in the data retrieval space based on the feature value of the target data, to access the target data.

12. The non-transitory, computer-readable medium of claim 10, wherein the URL further comprises a code identification field recording an output coding scheme of the target data; and
  the returning the target data to the node device comprises:
    parsing the code identification field to obtain the output coding scheme of the target data;
    coding the target data based on the output coding scheme; and
    returning the coded target data to the node device.

13. The non-transitory, computer-readable medium of claim 12, wherein the output coding scheme comprises a JavaScript Object Notation (JSON) scheme or an Extensible Markup Language (XML) scheme.

14. The non-transitory, computer-readable medium of claim 10, wherein the feature value field of the URL records a digital digest of the target data; and the invoking the data access driver to parse the access request to access the target data further comprises:
  determining that a digital digest of the target data is the same as the digital digest of the target data recorded in the feature value field of the URL; and
  in response, returning the target data to the node device.

15. The non-transitory, computer-readable medium of claim 9, wherein the domain field further comprises the following fields:
  a protocol field recording a protocol name of a blockchain protocol supported by the target blockchain; and
  an instance field recording an instance name of an instance of the target blockchain, wherein the target blockchain serves as a blockchain supporting the blockchain protocol.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
  obtaining an access request that is specific to target data and that is sent by a node device, wherein the target data is stored in a target blockchain of a multi-chain system that comprises a plurality of blockchains, wherein the access request comprises an access path of the target data;
  determining, based on the access path of the target data, the target blockchain that the target data is located in;
  determining, based on the access path of the target data, a corresponding data access driver configured for the target blockchain; and
  invoking the corresponding data access driver to parse the access request to access the target data,
wherein the access request comprises a uniform resource locator (URL), and the URL comprises the access path of the target data, and wherein the URL comprises a domain field recording information about the target blockchain that the target data is located in; and the determining, based on the access path of the target data, the target blockchain that the target data is located in comprises:
  determining, based on the domain field of the URL, the target blockchain that the target data is located in.

* * * * *